United States Patent [19]

Spinks, Jr. et al.

[11] Patent Number: 4,545,059
[45] Date of Patent: Oct. 1, 1985

[54] ANTENNA COUPLER SYSTEM

[75] Inventors: R. Joe Spinks, Jr., Marion; Glenn R. Snider; Richard E. Deasy, both of Cedar Rapids, all of Iowa

[73] Assignee: Rockwell International Corporation, El Segundo, Calif.

[21] Appl. No.: 593,794

[22] Filed: Mar. 27, 1984

[51] Int. Cl.$^4$ .................. H04B 12/00; H04B 7/12
[52] U.S. Cl. ............................ 375/1; 375/63; 455/123; 455/275
[58] Field of Search ............ 375/1, 63; 455/103, 455/120, 121, 123, 129, 269, 272, 275, 277, 289; 333/17; 343/354, 368, 371, 372, 722, 853

[56] References Cited

U.S. PATENT DOCUMENTS

| | | | |
|---|---|---|---|
| 2,712,061 | 6/1955 | McClellan | 375/63 |
| 3,095,539 | 6/1963 | Bennett et al. | 375/63 |
| 3,916,313 | 10/1975 | Lowry | 375/1 |
| 4,030,033 | 6/1977 | Bibl et al. | 375/1 |

Primary Examiner—Benedict V. Safourek
Attorney, Agent, or Firm—George A. Montanye; H. Fredrick Hamann

[57] ABSTRACT

There is disclosed an antenna and coupling system for use in frequency hopping communication systems. The system includes a dual antenna configuration wherein the antennas are coupled in parallel to a tunable broadband coupler which provides a VSWR which is nominally less than 2:1 over the full hopping bandwidth of the system. The antenna and coupling system are so constructed that the coupler is operated over a plurality of passbands defining a broadband frequency range and each passband is of sufficient width such that several hopping band center frequencies can fall within a given passband. The passbands also overlap to permit continuous frequency coverage over the frequency range of the system.

13 Claims, 4 Drawing Figures

ANTENNA COUPLER SYSTEM

BACKGROUND OF THE INVENTION

The present invention relates to communication systems and, more particularly, to high frequency communication systems employing frequency hopping for broadband operation.

In communications systems in the prior art, it is well known to include a tunable coupling network which is designed to match the impedance of a power amplifier to an antenna which transmits and receives modulated carrier frequencies. Such systems are operable in the high frequency (HF), very high frequency (VHF), and ultra high frequency (UHF) ranges to maximize impedance matching to the antenna at the desired frequency. In such conventional transmitting systems, the output of a power amplifier may be coupled and impedance matched to the antenna by providing a tunable narrowband coupler which changes the impedance in accordance with the center frequency of the carrier wave.

While such systems allow frequency matching in a variety of different communication environments, the same are restricted in their versatility and applicability to state-of-the-art communications systems. In particular, the antennas and matching networks used to form the couplers are narrowband in nature and thus provide a very narrow frequency range of operation where the efficiency is optimized about the center frequency. Accordingly, if the system must be switched from one frequency of operation to another, the narrowband matching network must also be adjusted to precisely match the impedance for operation at a new center frequency. As will be appreciated, the switching is performed by adjustment of the elements (capacitors and inductors) of the matching network which has been conventionally implemented by relay switching networks used to insert or remove inductors and capacitors to alter the reactive impedance between the transmitter or receiver and the antenna.

While the above systems are acceptable when there are no limitations on the speed necessary to switch between one center frequency and another, the same become unacceptable in broadband systems requiring frequency hopping operation over a wide frequency range. In particular, in present-day communications systems which require communication in environments subject to electromagnetic interference, it is desirable to selectively alter (hop) the carrier frequency in accordance with a predetermined pattern over a wide frequency range. Such systems are known as frequency hopping systems and hop from one frequency to another to produce transmission in accordance with a predetermined pattern of changes (algorithm) in the carrier frequencies. It has been discovered, however, that narrowband matching networks (couplers) which are designed to provide matching to a high Q antenna at a particular center frequency, are incapable of being used to change the impedance at sufficient speeds to match the change in center frequency in response to the frequency hopping. Specifically, the hopping with such narrowband matching networks is limited by noise and electrical difficulties, and by the speed of the relays which are normally employed to change the impedance of the coupler so that the needed change in the reactance of the matching network is accomplished for each hopping center frequency. Accordingly, the use of variable narrowband couplers to provide narrowband impedance matching is severely restricted and not generally applicable to broadband frequency hopping communications systems.

In certain instances, however, such narrowband couplers have been used to alter the matching network from one center frequency to the next by driving a high impedance at the output of the coupler. The effect of such a high impedance between the coupler and the antenna is to produce an essentially broadband match over the entire frequency range of operation. In such instances, however, the large impedance requirement causes unnecessary power dissipation which is the penalty for attaining a more broadband operation than that which can be acquired by the use of a conventional narrowband matching network with a narrow band antenna. As a result, there is still a need to provide a communication system including an antenna and coupler which is not restricted to narrowband operation.

Accordingly, the present invention has been developed to overcome the shortcomings of the above known and similar techniques and to provide an antenna and coupling system for use in broadband frequency hopping communication systems.

SUMMARY OF THE INVENTION

In accordance with the present invention, the output of a radio transmitter is coupled through a power amplifier and amplified to provide output through a tunable broadband coupler. The broadband coupler is in turn coupled to two antennas connected in electrical parallel reducing antenna Q. The reduction in the Q of the antenna allows the use of a tunable matching network having a wide instantaneous bandwidth and which may be controlled in accordance with the frequency hopping operation of the system to provide an impedance match with a VSWR nominally less than 2:1 over the full hopping bandwidth. The broadband coupler is constructed to have a plurality of overlapping passbands defining the hopping frequency bandwidth wherein each passband has a width such that several hopping center frequencies may fall within one passband. The antenna coupler passbands are constructed to overlap so that continuous frequency coverage can be obtained over the full hopping bandwidth of the communication system.

It is therefore a feature of the invention to provide a broadband communication system having an improved antenna coupler for providing broadband frequency hopping operation.

It is still another feature of the invention to provide a dual antenna broadband frequency hopping communication system.

It is yet another feature of the invention to provide a broadband frequency hopping system which maintains a VSWR at less than 2:1 over the full hopping bandwidth.

Still another feature of the invention is to provide a broadband frequency hopping communications system which may be implemented with conventional elements.

Yet another feature of the invention is to provide a broadband frequency hopping communication system having a broadband coupler including plural passbands and cooperating such that several hopping center frequencies fall within each passband of the coupler.

A still further feature of the invention is to provide a broadband antenna and coupling system employing parallel connected antennas.

These and other advantages and novel features of the invention will become apparent from the following detailed description when considered with the accompanying drawing wherein:

DETAILED DESCRIPTION OF A PREFERRED EMBODIMENT

Figure 1:
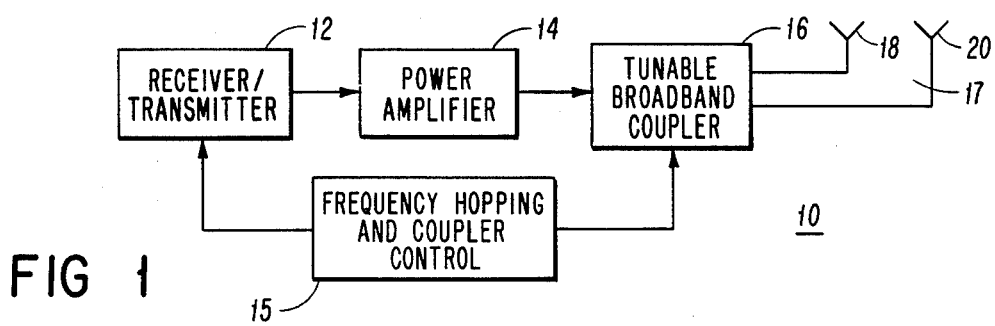
FIG. 1 is a schematic block diagram of the system of the present invention.

Referring now to the drawing, there is shown a broadband antenna and tunable coupler operating in a frequency hopping communications system 10. The system 10 includes a transmitter 12 of conventional construction which is controlled by a frequency hopping control 14 to change the carrier frequency (hopping center frequency) transmitted by the transmitter 12. The frequency hopping control 14 may be of any variety known in the prior art and is specifically designed to change the carrier in accordance with a predetermined pattern (algorithm) so that transmission and reception of communications modulated on the carrier generated by transmitter 12 will be less susceptible to interference. It should be appreciated that while the system will be described with respect to impedance matching for a transmitting system, the same is equally applicable to receiving systems or systems employing a transceiver.

The output from the transmitter 12 is coupled through a power amplifier, also constructed in a conventional manner, to amplify the modulated carriers over the frequency hopping range and to provide that amplified output to a coupler 16 which matches the impedance at the carrier frequency at the output of the power amplifier 14 to the impedance of the transmitting antenna 17 of the system. As was noted above, in conventional systems, the coupling network 16 may be a narrowband coupler which provides a narrowband impedance match at a particular center frequency to a single narrowband antenna. In such systems, while the frequency match provides high efficiency operation and little power dissipation because of that narrowband impedance match, the same is very limited in its versatility and range of operation. In particular, single antennas tend to have a very narrow bandwidth and thus limit the frequency range of operation of the system. Furthermore, the ability of the narrow bandwidth coupler to move from one center frequency to the next is generally limited by the speed of switching of relays which change the reactance produced by capacitors and inductors in the coupler 16. Therefore, in a frequency hopping system, the performance of a narrowband coupler with a single antenna is insufficient to produce the necessary switching for frequency hopping operation over the wide band of frequencies used in such systems.

While broadband couplers are known in the art, there has been no previous implementation using a tunable broadband coupler in connection with a frequency hopping system to provide effective broadband application in the manner described herein. Specifically, such broadband couplers have been employed with multiple channel systems wherein the speed of switching and its applicability in a frequency hopping transmission system has not been considered. Furthermore, such systems have been employed where the speed of the change in the coupling network is not critical to the operation of the system. As a result, there has been no suggestion to employ a tunable broadband coupler in any manner similar to that employed in the frequency hopping system of the present invention.

More specifically, the antenna of the system 10 is formed by two radiating elements 18 and 20. For the purposes of the present example, the two antenna elements 18 and 20 are constructed as 16-foot whip antennas (monopole antennas) or suitably broadband antennas of conventional construction, but may be any other dual antenna arrangement used in accordance with the present teachings. Likewise, the present system will be described with respect to its use in providing a broadband antenna and coupler in the frequency hopping system of a vehicular communications system, but is equally applicable to any other environment capable of using the dual antenna structure of the present teachings.

In accordance with the conventional use of the 16-foot whip antennas, a single antenna is normally employed to provide the transmission of the carrier frequency. The characteristics of such a monopole antenna are such that it has a low frequency Q of approximately 300 and is not efficient for broadband matching due to its limited bandwidth. Thus, while its use with a narrow bandwidth coupler for impedance matching would be evident, broadband matching has not been suggested.

Pursuant to the present technique, each of two 16-foot whip antennas are electrically coupled in parallel. The result of this parallel coupling produces a configuration which decreases the effective length-to-diameter ratio of the antenna and thus decreases the low frequency Q to approximately 30. The net effect of this configuration is to increase the effective bandwidth of the antenna formed by the individual elements 18 and 20. The resulting structure of the dual whip assembly produces an impedance as a function of frequency of such a nature that the antenna 17 can be used within the capabilities of an uncomplicated matching network (coupler) to provide a wide instantaneous bandwidth suitable for frequency hopping operation. In particular, the broadband coupler 16 may be used with the parallel coupled antenna elements 18 and 20 (which are each connected to the coupler 16 by a 125 ohm—high impedance—coaxial cable) to insure a VSWR which is nominally less than 2:1 over the full hopping bandwidth of the system. This is in contrast to the use of a narrow band coupler which only provides the same limited VSWR at the center frequency of the coupler.

Figure 2:
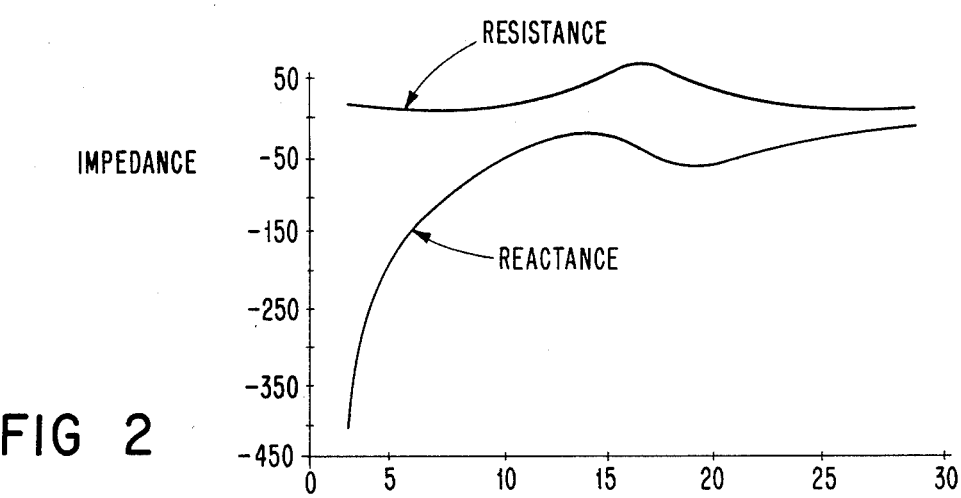
FIG. 2 is a graphical representation of the impedance versus frequency of single and dual-parallel connected antennas.

Referring now to FIG. 2, there is shown a graphical representation of impedance versus frequency for the dual whip antenna 17. The dual whip structure produces a lower impedance which more closely approaches a nominal 50 ohms and thus provides broader bandwidth characteristics allowing its utilization across a very wide band of frequencies.

Figure 3A:
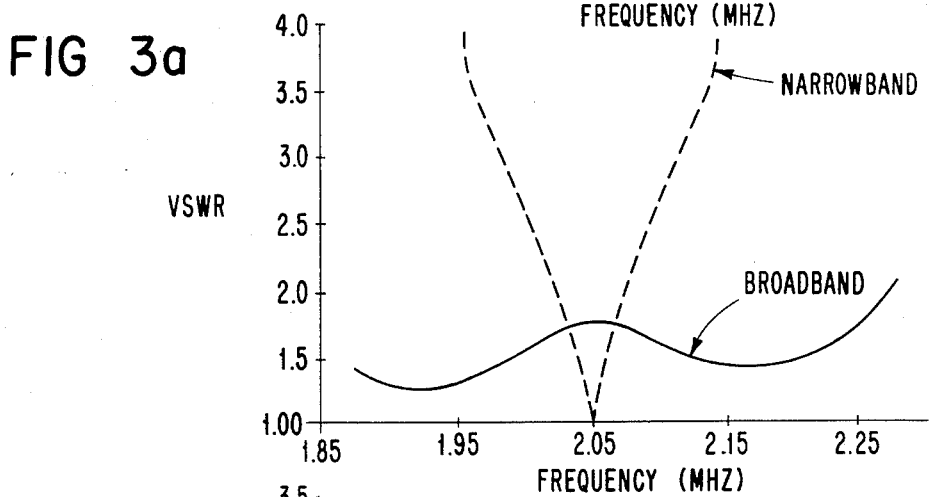
FIGS. 3a and 3b are graphical representations of bandwidth and passband characteristics of the broadband system of the present invention.

Referring next to FIG. 3a, there is shown a plot of VSWR vs. frequency for a narrowband coupler as contrasted with a broadband coupler. As will be seen in the drawing, the VSWR response for a narrowband coupler often greatly exceeds 2:1, with relatively narrow variations from the center frequency of 2.05 MHz illustrated in the drawing. In contrast, the VSWR response of the broadband coupler matched to the broadband dual antenna 17 including elements 18 and 20 of FIG. 1, produces a VSWR across a very broad band of frequencies which is less than 2:1. The result of the broadband coupler and antenna arrangement is therefore a broadband technique which provides a superior hopping bandwidth. While the radiated power for the broadband system is less than the narrowband in a very limited range about the center frequency, that same radiated power is consistently better than the narrowband outside those very narrow limits about the center frequency. The particular configuration therefore allows a more simplified approach to implementation of broadband frequency hopping system which may be upgraded to accommodate different frequency hopping patterns with relative ease.

Referring again to FIG. 1, the significance of using a broadband tunable coupler in combination with the parallel combination of the antenna 17 formed by dual elements 18 an 20 is best understood by again comparing the use of a tunable narrowband coupler and single antenna having a narrow bandwidth in a frequency hopping system. In such instances, for each hopped frequency, the narrow band coupler must be tuned to the new center frequency representing that hopped frequency. Given the state-of-the-art in mechanical and electrical switching of capacitor and inductor elements to accomplish the change in impedance for a narrowband network, the aforementioned noise and speed problems severely limit the rate of frequency hopping as well as the bandwidth over which the frequency hopping may be employed. In addition, due to the narrow bandwidth of the antenna, the hopping cannot be performed over a very wide frequency range.

Figure 3B:
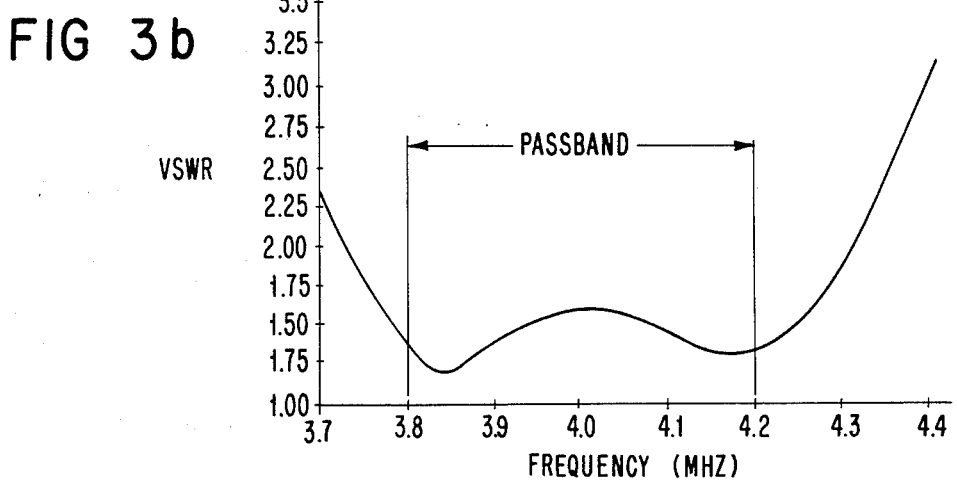

In accordance with the present invention, however, the broadband coupler impedance matching network 16 is constructed such that the coupler may be tuned over a wide frequency range to encompass a wider hopping bandwidth and includes a plurality of passbands which overlap one another to define the frequency hopping band and permit continuous frequency coverage. In addition, each passband of the full hopping bandwidth which may be attained by the coupler 16, is constructed such that several hopping band center frequencies (instantaneous bandwidth) can fall within one of those plurality of passbands. This is accomplished by switching the appropriate inductors and capacitors to produce a passband, which in the present instance may be approximately 10% wide or more at any given center frequency. This is more particularly shown in FIG. 3b wherein VSWR is plotted against frequency to show the passband of a broadband coupler at a given center frequency.

With the above construction, the frequency hopping of the transmitter is then controlled so that several frequency hops occur within one passband of the tunable broadband coupler 16 before the coupler 16 is tuned to a new passband. The system is then operated such that the frequency hopping and coupler control 14 produces multiple changes of the hopping center frequencies within one passband of the coupler and a change to a new passband when the pattern of hopping frequencies produces a hopping center frequency which is to fall outside the selected coupler passband. The result of this construction and operation is to provide multiple frequency hops within a single coupler passband before switching is required to another coupler passband thereby enabling a faster frequency hop over that which can be accomplished in a narrowband network requiring tuning of the network for each frequency hop. Retuning is therefore not required for changing hopping frequencies within a coupler passband, and only required upon the change of the hopping center frequency to another passband.

In accordance with the above construction and operation, the tunable broadband coupler may be constructed in a variety of conventional ways to produce and change the passbands of the coupler. Specifically, the broadband coupling network may include a plurality of inductors and capacitors individually switched into and out of the circuit by relays controlled by relay drivers. The relay drivers may be controlled by a microprocessor which coordinates the configuration of inductors and capacitors for each passband with the frequency hopping to insure that multiple frequency hops occur within each passband before that particular passband is changed by changing the inductors and capacitors in the coupler. By way of example, there are a variety of prior known systems employing relay switched inductors and capacitors for providing an impedance matching network which may be used as a coupler over wide frequency ranges. Such exemplary systems are shown in U.S. Pat. No. 3,794,941 and U.S. Pat. No. 4,201,960 which disclose tuning and control circuits and the associated inductor-capacitor relay switching and computer or logic control. A microprocessor, for example, or any other logic control, may therefore be conventionally programmed in accordance with the hopping frequency algorithm to change the configuration of the inductors and capacitors forming a given passband after several hops within a passband.

With respect to the particular selection of inductors and capacitors needed to provide a passband within the broadband frequency matching capability of the coupler, the same can be determined by simple measurements of the antenna impedances at different hopping frequencies. The values for inductance and capacitance which must then be provided for matching by the coupler at a particular hopping center frequency, can be programmed within the microprocessor. Those same inductor and capacitor configurations can also be conventionally constructed to provide an approximately 10% passband at the selected hopping center frequency in accordance with known engineering principles. The same techniques can further be used to provide a passband or channel overlap of approximately 2.5% to ensure continuous frequency continuity over the full hopping bandwidth. Likewise, the impedance matching can be produced to provide for the nominal VSWR of 2:1 over the entire hopping bandwidth of the system. Because of the lowered reactive impedance of the antenna 17 produced by the parallel mounting of the two antenna elements 18 and 20, coupler 16 matching of the power amplifier 14 output to the antenna 17 within a 2:1 VSWR can be easily attained.

In accordance with the present invention, dual 16-foot whip monopole antennas have been constructed along with a coupler formed by 45 relay switched binary stepped inductors and capacitors for providing band coverage over a frequency range of 2-30 MHz. The system provides a VSWR of no greater than 2:1 over that frequency range and can provide tuning for changing the passbands in less than 100 milliseconds. The system provides a broadband match across hopping or spread spectrum bandwidths and improves high frequency operation of communications systems in an interference environment. The system may be used with vehicles or in any other environment which provides the coupler and antenna matching in the frequency hopping system as described herein. These are all features which are not shown or suggested by any of the prior art.

Obviously, many other modifications and variations of the invention are possible in light of the above teachings. It is therefore to be understood that within the scope of the appended claims, the invention may be practiced otherwise than as specifically described.

What is claimed is:

1. A broadband communications system comprising:
   means for generating a plurality of carrier frequencies within a band of frequencies;
   antenna means for transmitting said plurality of carrier frequencies;
   coupler means coupled between said means for generating and said antenna means for providing a tunable impedance match over said band of frequencies and including a plurality of passbands defining said band of frequencies; and
   means for controlling said means for generating and said coupler means for hopping said carrier frequency within said band of frequencies and changing said passbands of said coupler means to provide an impedance match in response to said frequency hopping in such a manner that multiple frequency hops occur within a single passband before the passband of said coupler is changed.

2. The system of claim 1 wherein said antenna means includes two 16-foot monopole antennas coupled in parallel with one another.

3. The system of claim 2 wherein said monopole antennas are each coupled to said coupler by a 125 ohm coaxial cable.

4. The system of claim 1 wherein said band of frequencies is from 2–30 MHz.

5. The system of claim 1 further including power amplifying means for amplifying said generated carrier frequencies and providing said amplified carrier frequencies through said coupler means.

6. The system of claim 1 wherein each passband of said coupler means is constructed to have an approximately 10% width about a center frequency, and wherein each passband in said band of frequencies overlaps adjacent passbands by approximately 2.5%.

7. The system of claim 1 wherein said coupler means is constructed to maintain a VSWR of less than 2:1.

8. A broadband communication system comprising:
   antenna means for receiving a plurality of modulated carrier frequencies over a band of frequencies;
   receiver means for receiving and demodulating said plurality of carrier frequencies received by said antenna means;
   tunable broadband coupler means coupled to impedance match said receiving means with said antenna means over said band of frequencies, said coupler means having a plurality of tunable passbands defining said band of frequencies; and
   means for controlling said receiver means and said coupler means for hopping said carrier frequency within said band of frequencies and changing the passbands of said coupler means to provide an impedance match in accordance with said frequency hopping such that multiple frequency hops occur within any selected passband before changing to another passband.

9. The system of claim 8 wherein said antenna means includes two monopole antennas coupled in parallel with one another.

10. The system of claim 9 wherein said monopole antennas are each coupled to said coupler by a 125 ohm coaxial cable.

11. The system of claim 8 wherein said band of frequencies is from 2–30 MHz.

12. The system of claim 8 wherein each passband of said coupler means is constructed to have an approximately 10% width about a center frequency, and wherein each passband in said band of frequencies overlaps adjacent frequencies by approximately 2.5%.

13. A method of providing frequency hopping transmissions comprising:
   generating a plurality of modulated carrier frequencies and hopping said carrier frequencies within a band of frequencies in accordance with a predetermined pattern;
   transmitting said carrier frequencies within said band of frequencies from dual antennas coupled in electrical parallel with one another;
   matching the impedance from said generating means to said parallel coupled antennas with a tunable broadband coupler having a pluralty of passbands defining said band of frequencies by changing said passbands to provide impedance matching with said band; and
   controlling said carrier frequency hopping and said change of passbands so that multiple hops occur within a selected passband before that passband is changed.

* * * * *